United States Patent [19]

Kelly

[11] 4,438,782

[45] Mar. 27, 1984

[54] ISOLATION STEAM VALVE WITH ATMOSPHERIC VENT AND RELIEF CAPABILITY

[75] Inventor: Joseph E. Kelly, Vienna, Va.

[73] Assignee: The United States of America as represented by the Secretary of the Navy, Washington, D.C.

[21] Appl. No.: 350,919

[22] Filed: Feb. 22, 1982

Related U.S. Application Data

[63] Continuation-in-part of Ser. No. 153,123, May 27, 1980, abandoned.

[51] Int. Cl.³ .............................................. F17D 1/06
[52] U.S. Cl. .................................. 137/628; 137/862; 137/866
[58] Field of Search ............... 137/628, 862, 863, 864, 137/866, 868, 871

[56] References Cited

U.S. PATENT DOCUMENTS

| | | | |
|---|---|---|---|
| 624,821 | 5/1899 | Kinner | 137/628 |
| 1,064,565 | 6/1913 | Thurber | 137/628 |
| 1,825,568 | 9/1931 | Wray | 137/628 |
| 2,277,837 | 3/1942 | Auld et al. | 137/68 |
| 2,327,942 | 8/1943 | Thoresen | 137/866 |
| 2,807,281 | 9/1957 | Allen et al. | 137/866 |
| 2,988,279 | 6/1961 | Irwin | 236/26 |
| 3,335,756 | 8/1967 | McPherson | 137/628 |
| 3,339,586 | 9/1967 | Tenkku et al. | 137/628 |
| 3,974,861 | 8/1976 | Goto et al. | 137/627.5 |

FOREIGN PATENT DOCUMENTS 1215014 12/1970 United Kingdom ............... 137/868

Primary Examiner—Ronald C. Capossela
Attorney, Agent, or Firm—R. F. Beers; K. E. Walden

[57] ABSTRACT

An isolation steam valve arrangement for use on the exhaust side of a steam turbine for directing exhaust steam therefrom to steam operated auxiliary equipment and for relieving or venting steam to the atmosphere. The valve arrangement includes a casing, or body provided with a single inlet and plural outlets. A main valve between the inlet and one of the outlets is selectively positionable from fully open to fully closed for controlling steam flow through one outlet for operating auxiliary equipment. A normally closed vent valve between the inlet and other outlet is adapted to open upon closure of the main valve to establish open communication between the inlet and other outlet in order to continuously vent to the atmosphere a low volume of steam from upstream of the main valve. A normally closed pressure operable relief valve is adapted to relieve to the atmosphere a high volume of pressurized steam from upstream of the main valve.

12 Claims, 5 Drawing Figures

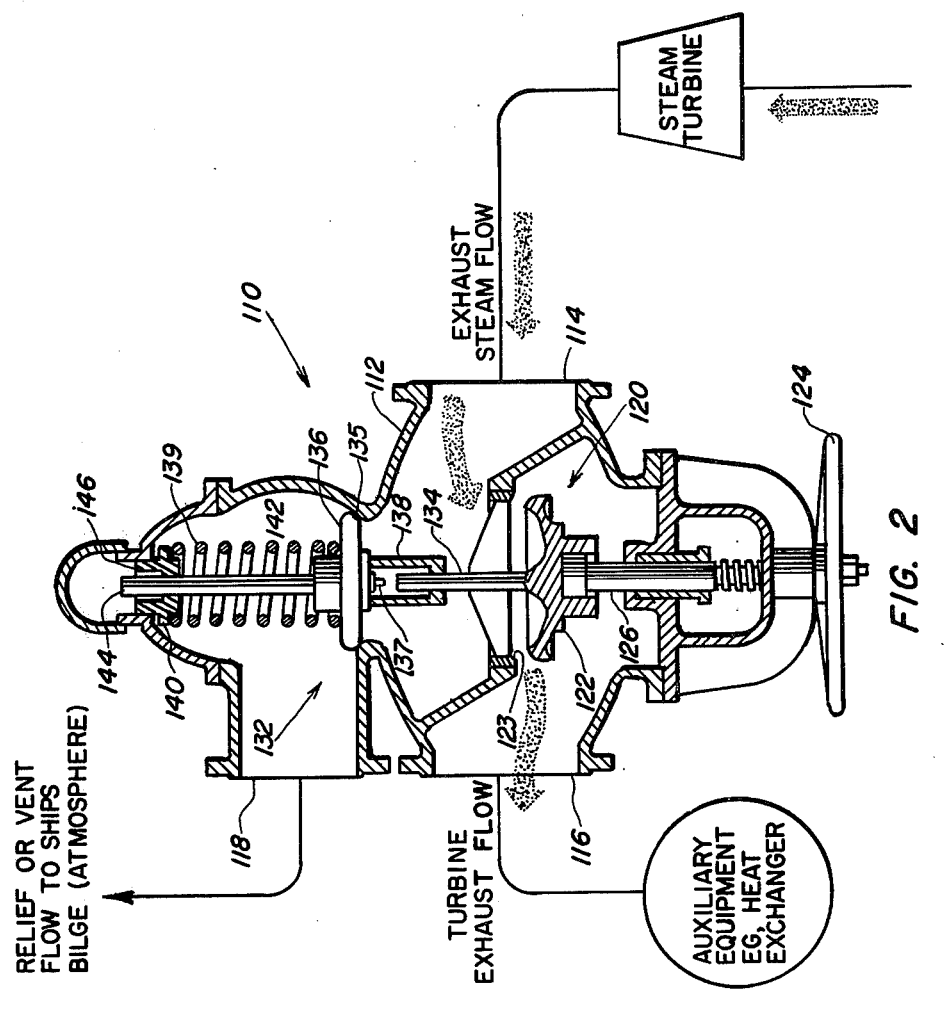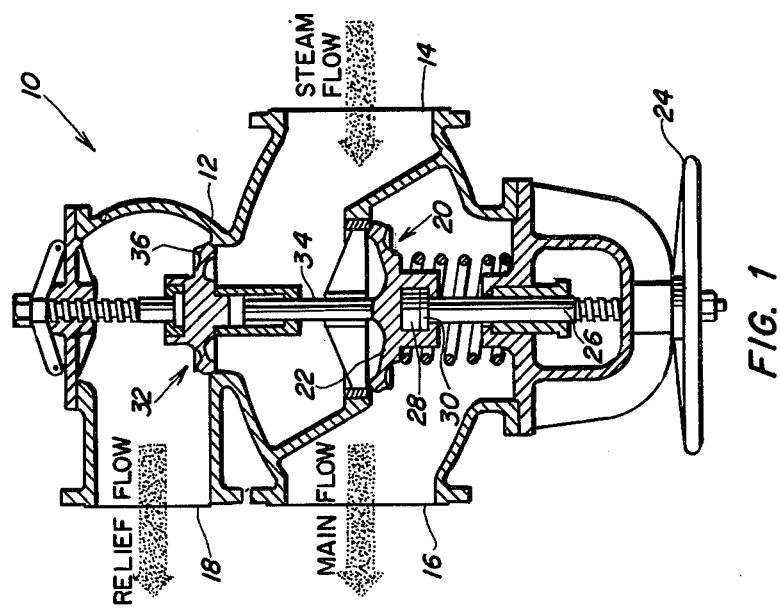

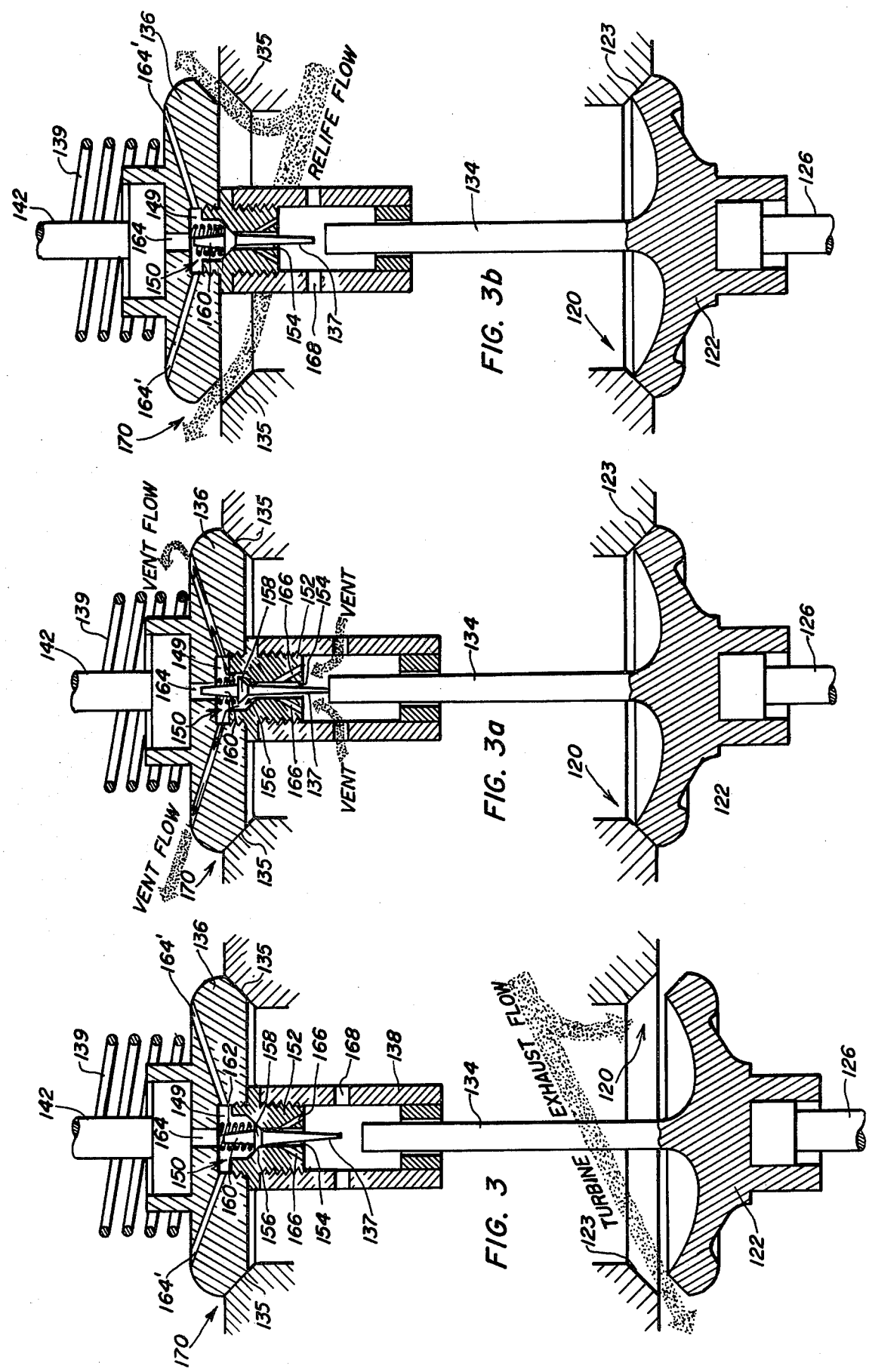

ISOLATION STEAM VALVE WITH ATMOSPHERIC VENT AND RELIEF CAPABILITY

CROSS-REFERENCE TO RELATED APPLICATION

This is a continuation-in-part of application Ser. No. 153,123 filed May 27, 1980 now abandoned.

BACKGROUND OF THE INVENTION

It is common practice in a ship's engine room to place an isolation valve on the exhaust side of a steam turbine and upstream of other steam operated equipment. A valve commonly used for this purpose will include a housing or casing normally having a single inlet and two outlets with valve closures upstream of each outlet. One of these closures is identified as a main valve, and is usually handwheel operated with spring loading and adapted to be opened against force of the spring to dump steam to the exhaust system. This main valve includes a disc which is adapted to open downstream due to a greater pressure upstream, much in the same manner as a relief valve. The disc is opened by a stem withdrawn by rotation of the handwheel. This is the normal open operating position. There is a disadvantage to this arrangement in that turning down the stem too far positively prevents the main valve from opening, even as a relief valve, regardless of upstream pressure, thus creating an operating hazard. The other closure is a secondary valve which may be provided for discharging steam to the atmosphere. It is usually a wrench operated valve, open only when the turbine is out of service, and is used to prevent pressurization of the valve casing due to leakage through the steam turbine. Another disadvantage of the prior arrangement is that leaving the auxiliary valve open prevents opening of the main valve. Such an isolation valve is illustrated in FIG. 1.

SUMMARY OF THE INVENTION

In brief, the present invention provides a steam valve for use on the exhaust side of an auxiliary steam turbine for handling low pressure exhaust steam to auxiliary equipment. The valve includes a casing having one inlet and two outlets with valves or closures upstream of the outlets for controlling the passage of steam from the inlet through either or both of the outlets. One of the valves, identified as a main valve, is adapted to be positioned from fully open to fully closed upon rotation of a handwheel which linearly moves a threaded stem. The other valves are identified as a vent valve and a relief valve.

When the main valve is open and the turbine is operating, exhaust steam passes through the valve casing inlet, through the main valve, and out through one of the outlets to auxiliary equipment. When the turbine is shut down, closure of the main valve positively opens a small vent valve which establishes open communications from upstream of the main valve to the atmosphere. Therefore, should there be a trickle of steam flow through the turbine, it will be continuously vented to the atmosphere, usually via the ship's bilge. In the event of overpressurization, such as would be caused by admitting steam to the turbine without first having opened the main valve, steam will be relieved to the atmosphere (bilge) through a spring loaded relief valve. In either event, operating personnel are protected from (1) low volume steam leakage through a static turbine and (2) inadvertent admission of steam to the turbine without the main valve having first been opened. These are safety features not previously employed.

OBJECTS OF THE INVENTION

It is therefore an object of the invention to provide an improved isolation steam valve arrangement for use on the exhaust side of a steam turbine and upstream of auxiliary steam using equipment.

It is another object of the invention to provide an isolation steam valve arrangement on the exhaust side of a steam turbine which includes a main valve for passing exhaust steam to auxiliary equipment, a vent valve operable in conjunction with the main valve for providing open venting to the atmosphere of steam seeping through a "shut-down turbine", and a relief valve for relieving a high volume of steam inadvertently admitted to the turbine.

It is still another object of the invention to provide an isolation steam valve arrangement having plural valves wherein the position of any one never overrides the safety feature of the others.

Other objects and advantages of the isolation steam valve arrangement will become known to one skilled in the art upon studying the specification and referenced drawings.

BRIEF DESCRIPTION OF THE DRAWINGS

FIG. 1 is a cross sectional view of an isolation steam valve presented only for illustrating a feature which is a safety hazard to operating personnel.

FIG. 2 is a partial cross sectional view of an isolation steam valve according to the present invention with the main valve open and all other valves closed.

FIGS. 3, 3a and 3b are cross sectional views illustrating portions of valves of FIG. 2 in their several positions. FIG. 3 shows the main valve open and both the vent and relief valves closed; FIG. 3a shows the main valve closed with the vent valve open; and, FIG. 3b shows the main valve closed and the relief valve opened (vent valve closed).

DESCRIPTION OF THE PREFERRED EMBODIMENT

FIG. 1 discloses in cross-section a valve construction now in common use as an isolation valve on the exhaust side of a ship's auxiliary turbine. Description of this valve and details of its operation will be made only to an extent of providing some background for an understanding of the problem to which the present invention is directed. Steam valve 10 includes a casing, housing or body 12 having a single inlet 14 and two outlets 16 and 18, for main flow and relief/venting flow, respectively. Inlet 14 is adapted to be connected to piping on the exhaust side of an auxiliary steam turbine (not illustrated). A globe valve 20 is provided upstream of main outlet 16. Disc 22 of this globe valve is spring loaded or biased to a normally closed position, and is adapted to be positively opened or closed by manual rotation of handwheel 24 to extend or retract threaded stem 26. The stem and disc have between them an axial space 28 to permit the valve to open partially due to a greater pressure upstream than downstream, somewhat like a relief valve. The pressure differential must be sufficient, however, to overcome the force of the spring which urges disc 22 closed. Head 30, on the upper end of stem 26, is adapted to positively lift disc 22 from its seat upon withdrawal of stem 26 by turning of handwheel 24. This is the normal operating mode (open) for valve 20. The disadvantage of the design and operation of the arrangement disclosed in FIG. 1 is that when disc 22 is closed by rotation of handwheel 24, stem 26 may be advanced farther than necessary and head 30 brought into interference with the bottom of disc 22. This will nullify the built in relief feature of valve 20, thus creating an operating hazard. Auxiliary valve 32, upstream of outlet 18, is a wrench operated globe valve which is opened when the turbine serviced by valve 10 is out of service for maintenance or overhaul. Outlet 18 is adapted for discharging steam to the atmosphere, and is provided to prevent pressurization in valve casing 12 due to leakage back through outlet 16 and "closed" main valve 20. Disc 22 of main valve 20 has an extension stem 34 on its upstream side which is operatively connected with lost motion to disc 36 of auxiliary valve 32, as illustrated in FIG. 1. Extension stem 34 operatively connects valves 20 and 32 to prevent opening of both at the same time. A disadvantage of the arrangement illustrated in FIG. 1 is that if valve 32 is left open to the atmosphere, it prevents opening of valve 20 for discharge of steam through outlet 16 to whatever equipment it services.

There has been broadly described and illustrated in FIG. 1 a steam valve having certain deficiencies which have been identified. With these deficiencies in mind, there is disclosed in FIG. 2 a cross-sectional view of a valve according to the present invention. Numerals applied to the FIG. 2 embodiment reflect, where possible, a relationship to similar elements, features and functions found in FIG. 1. The valve arrangement, which is generally identified by the numeral 110, includes a housing, casing or body 112 having one inlet 114 and two outlets 116 and 118. The inlet is adapted to be connected through piping to the exhaust port of an auxiliary steam turbine to receive relatively low pressure steam of around 10-20 psi. Outlet 116, the main outlet, is adapted to be connected through piping to other engine room auxiliary equipment, such as a heat exchanger, to which turbine exhaust steam is supplied. From that auxiliary equipment the steam is directed back through a closed system (not shown) to the ship's boilers. Outlet 118, the auxiliary outlet, is adapted to have connected thereto a line for discharging relief steam via the ship's bilge to the atmosphere. The arrangement illustrated in FIG. 2 shows two valves 120 and 132 upstream of outlets 116 and 118, respectively, for performing separate but related functions. Main valve 120 is basically a globe valve of the type which comprises disc 122 and seat 123. Rotation of handwheel 124 moves stem 126 axially to position disc 122 relative to seat 123 for opening and closing the passage through valve 120. An extension stem 134 on the upstream side of disc 122 projects toward disc 136 of valve 132, but terminates short thereof as illustrated. The upper extremity of extension 134 projects into proximity with the bottom of stem 137 shown projecting from beneath disc 136, and is guided in respect thereto by guide sleeve 138 secured on the underneath side of disc 136. Stem 137 is an integral part of a vent valve housed within disc 136. The construction, function and purpose of this valve will be more fully disclosed hereinafter, particularly with reference to FIGS. 3, 3a and 3b, which are of a scale sufficiently large to permit clear illustration of such a relatively small valve. Disc 136 is urged toward the closed position on annular seat 135 by compression spring 139, backed against spring retainer 140. It defines a relief valve. Disc 136 carries an upwardly extending shaft 142 which is slidable received within fixed sleeve 146 and acts to aid disc 136 in stabilized movement toward and away from seating engagement.

Compression spring 139 is sized to hold disc 136 closed during normal operation, but permits disc 136 to be lifted from its seat upon steam over-pressurization to relieve steam pressure through outlet 118 to the atmosphere via the ship's bilge. Valve 132 is basically a relief valve; however, its disc 136 houses a vent valve which performs still another function. The vent valve selectively establishing open communication from upstream of valves 120 and 132 to outlet 118, whereby a small volume of steam leaked through the turbine when it is shutdown is vented to the atmosphere without lifting disc 136. Refer now to FIGS. 3, 3a and 3b where the valves are represented in their several operating positions. FIG. 3 illustrates the valves in the position shown in FIG. 2. Main valve 120 is open to allow turbine exhaust steam to pass therethrough. As long as steam is allow to pass freely through valve 120, there is no substantial pressure build up in the housing, and disc 136 of relief valve 132 remains closed by the resilient bias of coil spring 139. A central portion on the lower face of disc 136 is provided with a cavity 149 for receiving components of vent valve 150. The inner periphery of the cavity is provided with internal threading for receiving complementary threading of an insert body 152 which itself includes a cylindrical opening 154 terminating in a conical seat surface 156 defining a valve seat. A cylindrically shaped guide sleeve 138 is threaded over the lower end of insert body 152 for guiding extension stem 134 of valve disc 122 coaxially of opening 154. A vent valve body is located in cavity 149 and includes a conical disc portion 158 adapted for seating against conical seat 156 with its stem 137 coaxially disposed in vertical opening 154 in which it is positioned. Another stem 160 extends upwardly from the conical disc for centering compression spring 162 which resiliently closes vent valve 150. It will be noted that an opening 164 may be provided in disc 136 for receiving stem 160 of the valve when it is raised from its seat.

Opening 154 and in the insert body is of a diameter somewhat larger than that of stem 137 received therein. Disc 136 is provided with a plurality of radially disposed linear openings 164' for providing communication between cavity 149 and the downstream surface of the disc. The lower end of the insert body may be provided with a plurality of radially disposed openings 166 for providing for communication between cylindrical opening 154 and lower end of the insert body. A plurality of additional holes 168 are provided through the wall of stem guide 138. These openings allow entry of steam to flow up through opening 154 around stem 137 to beneath seated valve 150. It will be noted that in the valve arrangement illustrated in FIG. 3 that the upper end of extension 134 terminates short of end of stem 137. Therefore, vent valve 150 remains closed. This defines the arrangement when the turbine is operating and main valve 120 is open and passing steam to the auxiliary equipment.

When the steam turbine is shut down, main valve 120 is closed to the position illustrated in FIG. 3a. As disc 122 of main valve 120 is closed vent valve 150 is caused to open. The optimum length of extension 134 is determined empirically so that as valve disc 122 is progressively closed extension 134 moves into contact with stem 137 to cause opening of vent valve 150. For a period both valves will be slightly open. On the other hand, both the main valve and the vent valve may not both be closed at the same time.

When the turbine is shut down, main valve 120 is closed and vent valve 150 is forced open, thereby establishing communication to the atmosphere for any small amount of steam which may leak through the turbine. This leaked steam enters holes 168 to flow to cavity 149 through opening 154 surrounding stem 137 and out through radial openings 164' to the atmosphere. This prevents a build up of steam pressure in the valve casing which could amount to a safety hazard for personnel working on or in the vicinity of the turbine or auxiliary equipment.

In the event steam is inadvertently admitted to the turbine while main valve 120 is closed, as illustrated in FIG. 3a, obviously the vent valve and openings are of insufficient size to carry to the atmosphere such a large volume of steam. Pressure builds up and acts on relief valve 170 to lift disc 136 from its seat 139 to relieve a relatively large quantity of steam (relief flow) to the atmosphere via outlet 118 as illustrated in FIG. 3b. This avoids a pressure build up in the isolation valve itself.

In summary, during normal operation of the turbine (valve 120 open), exhaust steam passes directly through the valve casing to the auxiliary equipment. Both vent valve 150 and relief valve 170 are closed. When the turbine is shut down, a valve upstream thereof (not shown) is closed and main valve 120 is closed. This isolates the turbine. By the closing of valve 120 vent valve 150 is opened to establish open communication to the atmosphere for any steam that may leak into the valve casing. Furthermore, should full steam pressure be admitted to the turbine for its start up before main valve 120 is opened, steam pressure escapes through exhaust valve 170.

There has been described in the foregoing an isolation steam valve arrangement having certain characteristics and advantages for use between a steam turbine and auxiliary steam operated equipment.

While the invention has been particularly shown and described with reference to specific embodiment thereof, it will be understood by those skilled in the art that various changes in form and details may be made therein without departing from the spirit of the invention which is limited only by the scope of the claims annexed hereto.

What is claimed is:

1. An isolation steam valve arrangement for use between a steam turbine exhaust and another piece of steam-using equipment, comprising:
    a casing having an inlet and plural outlets;
    said inlet adapted to be connected to the discharge side of the steam turbine;
    one of the outlets adapted to be connected to another piece of steam-using equipment, and another of the outlet adapted to communicate to the atmosphere;
    a main valve between the inlet and one outlet;
    means for selectively controlling the main valve from fully open to fully closed for selectively passing turbine exhaust steam therethrough;
    a normally spring-force closed relief valve between the inlet and said another outlet adapted to open in response to steam pressure at the inlet above a predetermined amount;
    a normally spring-force closed vent valve between the inlet and another outlet; and
    means operatively interconnecting the vent valve and main valve;
    whereby, when the main valve is closed, the vent valve is positively open, thereby establishing open communication between the inlet and another outlet for allowing continuous steam venting to the atmosphere.

2. The invention according to claim 1 wherein the means operatively interconnecting the vent valve and main valve progressively opens the vent valve as the main valve is progressively closed.

3. The invention according to claim 1 or 2 wherein the vent valve is contained within the relief valve.

4. The invention according to claim 3 wherein the vent valve is adapted to open only when the relief valve is closed.

5. The invention according to claim 3 wherein the relief valve comprises a closure disc adapted to seat around its periphery against seat means in the casing.

6. The invention according to claim 1 wherein the relief valve comprises a closure disc adapted to seat around its periphery against seat means in the casing.

7. The invention according to claim 6 wherein the vent valve is normally spring-seated against seat means in the closure disc and is unseated by operation of the interconnecting means to allow steam to pass through passages from one side of the closure disc to the other.

8. An isolation steam valve arrangement comprising:
    a casing provided with an inlet and plural outlets;
    said inlet adapted to be connected to the discharge of a steam turbine, one of the outlets adapted to be connected to auxiliary steam operated equipment for directing turbine exhaust steam thereto, and another of the outlets adapted for communicating to the atmosphere;
    a main valve within the casing between the inlet and said one outlet;
    means for operating the main valve for selectively controlling flow of steam from the inlet to the one outlet;
    a normally closed vent valve between the inlet and said another outlet;
    means operatively interconnecting the vent valve and main valve for positively opening the vent valve whenever the main valve is closed, thereby establishing open communication between the inlet and said another outlet for allowing a low volume of steam to continuously vent to the atmosphere; and,
    a normally closed pressure-openable relief valve for relieving through said another outlet to the atmosphere a high volume of steam above a predetermined pressure.

9. The invention according to claim 8 wherein the vent valve is contained within the relief valve.

10. The invention according to claim 8 wherein the relief valve includes a spring-loaded closure disc resiliently urged into seating engagement with seat means in the casing and adapted to be unseated in response to steam pressure above a predetermined amount.

11. The invention according to claim 10 wherein the vent valve is disposed within the closure-disc of the relief valve.

12. The invention according to claim 11 wherein the closure-disc includes openings in communication with the vent valve whereby, when the vent valve is positively opened, steam passes from one side of the closure-disc to the other for escaping to the atmosphere.

* * * * *